United States Patent
Edwards et al.

(10) Patent No.: US 10,527,115 B2
(45) Date of Patent: *Jan. 7, 2020

(54) DISC BRAKE TONE RING

(71) Applicant: Consolidated Metco, Inc., Vancouver, WA (US)

(72) Inventors: William Joseph Edwards, Portland, OR (US); Andrew James Stratton, Vancouver, WA (US); Sven Arthur Torstveit, Vancouver, WA (US)

(73) Assignee: CONSOLIDATED METCO, INC., Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,589

(22) Filed: Apr. 6, 2018

(65) Prior Publication Data

US 2018/0223930 A1  Aug. 9, 2018

Related U.S. Application Data

(63) Continuation of application No. 15/422,045, filed on Feb. 1, 2017, now Pat. No. 9,964,164.

(51) Int. Cl.
| | |
|---|---|
| *B60T 8/32* | (2006.01) |
| *F16D 65/12* | (2006.01) |
| *B60T 7/20* | (2006.01) |
| *F16D 66/00* | (2006.01) |
| *F16D 65/02* | (2006.01) |

(52) U.S. Cl.
CPC ............... *F16D 65/12* (2013.01); *B60T 7/20* (2013.01); *B60T 8/323* (2013.01); *B60T 8/329* (2013.01); *F16D 66/00* (2013.01); *F16D 2065/1304* (2013.01); *F16D 2065/1376* (2013.01); *F16D 2065/1396* (2013.01); *F16D 2066/003* (2013.01)

(58) Field of Classification Search
CPC ............. F16D 65/12; B60T 8/329; B60T 8/32
USPC .................................. 188/17, 18 A, 218 XL
See application file for complete search history.

(56) References Cited

U.S. PATENT DOCUMENTS

| | | |
|---|---|---|
| 6,619,440 B2 | 9/2003 | Antony et al. |
| 7,219,778 B2 | 5/2007 | Pete et al. |
| 7,487,862 B2 | 2/2009 | Carlson et al. |

(Continued)

FOREIGN PATENT DOCUMENTS

| | | |
|---|---|---|
| CN | 1415056 A | 4/2003 |
| CN | 103161855 A | 6/2013 |

(Continued)

OTHER PUBLICATIONS

Search Report in corresponding European Application No. 18154542.7, dated May 30, 2018, 7 pages.

(Continued)

*Primary Examiner* — Christopher P Schwartz
(74) *Attorney, Agent, or Firm* — Amsted Industries Incorporated

(57) ABSTRACT

An assembly for an induction sensing tone ring is provided. A brake rotor includes a circular pocket. A tone ring is received in the circular pocket of the brake rotor. The brake rotor has a plurality of locating tabs, with each locating tab having a slope surface. The tone ring has a plurality of retaining tabs, with each retaining tab being received between two locating tabs of the brake rotor. A retaining ring is fitted in each locating tab slope surface of the brake rotor to press fit against the retaining tabs of the tone ring.

14 Claims, 2 Drawing Sheets

(56) References Cited

U.S. PATENT DOCUMENTS

| | | |
|---|---|---|
| 7,980,367 B2 | 7/2011 | Hester |
| 8,584,815 B2 | 11/2013 | Hester |
| 8,613,347 B2 | 12/2013 | Pahle |
| 9,759,281 B1 | 9/2017 | Stratton et al. |
| 2006/0272906 A1 | 12/2006 | Gonska |
| 2007/0051571 A1 | 3/2007 | Carlson et al. |
| 2017/0002878 A1 | 1/2017 | Burgoon |

FOREIGN PATENT DOCUMENTS

| | | |
|---|---|---|
| CN | 103453280 A | 12/2013 |
| CN | 104154147 A | 11/2014 |
| CN | 105102842 A | 11/2015 |
| DE | 10145947 C1 | 11/2002 |
| DE | 10237504 A1 | 3/2004 |

OTHER PUBLICATIONS

Office action in corresponding Chinese Application No. 201810099336.6, dated Mar. 5, 2019, 18 pages.

Office action in corresponding Japanese Application No. 2018-015247, dated Mar. 29, 2019, 4 pages.

Office action in corresponding Australian Application No. 2018200703, dated Nov. 7, 2018, 3 pages.

DISC BRAKE TONE RING

This application is a continuation of U.S. patent application Ser. No. 15/422,045, filed on Feb. 1, 2017, and titled "DISC BRAKE TONE RING," which is hereby incorporated by reference in its entirety.

BACKGROUND OF THE INVENTION

The present application relates to a method and an assembly including an inductive tone ring attached to a rotating part for speed and position sensing purposes.

The use of inductive tone rings for positional sensing, as in anti-lock brake applications, is known. However, the installation of the anti-lock brake system sensing ring, particularly to a disc brake rotor, has caused concern. Such concerns include difficult installation and replacement, the use of bolts and screws which can loosen or fail, and thermal transfer from the brake rotor to the tone ring causing dissimilar thermal expansion and warpage. Corrosion of the tone ring or tone ring features formed into the brake rotor is also a major cause of field issues. Often the tone ring will corrode beyond a usable condition prior to the wear limit of the rotor being met.

Accordingly, an improved arrangement and method for installing an inductive tone ring with a disc brake rotor assembly is provided.

SUMMARY OF THE INVENTION

An improved arrangement and method for attaching an inductive tone ring to a rotating part, which in the current manifestation is a brake rotor but could also be applied to a wheel hub, machine spindle or other rotating part in which rotational position or speed measurement is required.

The method as applied to a disc brake assembly comprises a brake rotor having an internal wall forming a circular pocket. An anti-lock brake tone ring is received in the circular pocket adjacent pocket adjacent a top surface of the brake rotor. The brake rotor internal wall includes a plurality of protruding members each having a retaining groove with an upper inclined surface formed in the internal wall of the brake rotor forming the circular pocket.

The tone ring has a plurality of retaining tabs. Each tone ring retaining tab is positioned between two of the brake rotor internal wall protruding members. A retaining ring is fitted into each of the brake rotor protruding member retaining grooves. The retaining ring presses against each of the retaining tabs of the tone ring.

The advantages of the improved tone ring attachment method of the present invention include reduced areas of contact between the brake rotor and the tone ring resulting in a reduction of thermal transfer from the brake rotor to the tone ring. The ring is not rigidly constrained, allowing it to "float" within the rotor attachment to avoid the warping at high temperatures that can occur if the ring is rigidly mounted to the rotor with screws or bolts. Corrosion effects are reduced as a result of the lower temperatures and minimal contact between the tone ring and the rotor. The elimination of screws, bolts or press-fits in the attachment of the tone ring to the brake rotor eases installation and replacement. Further, no drilling or tapping of screw or bolt holes in the rotor is required in order to prepare the rotor to receive the tone ring. The tone ring of the present invention is simply placed into position in the circular pocket of the brake rotor internal wall in engagement with the plurality of protruding members each having a retaining groove. The retaining ring is then fitted into each of the brake rotor protruding member retaining grooves. The retaining ring presses against each of the retaining tabs of the tone ring.

DETAILED DESCRIPTION OF THE DRAWINGS

Figure 1:
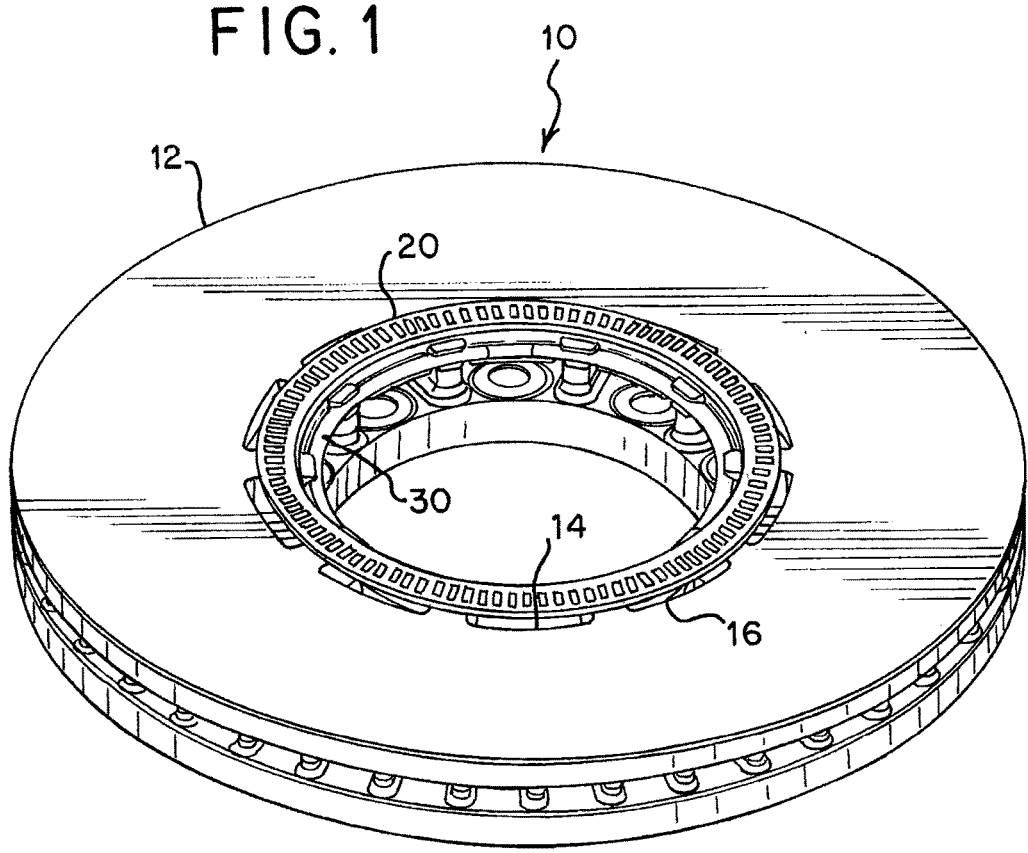
FIG. 1 is a perspective view of an assembled brake rotor and tone ring and retaining ring in accordance with a first embodiment of the present invention.
Figure 2:
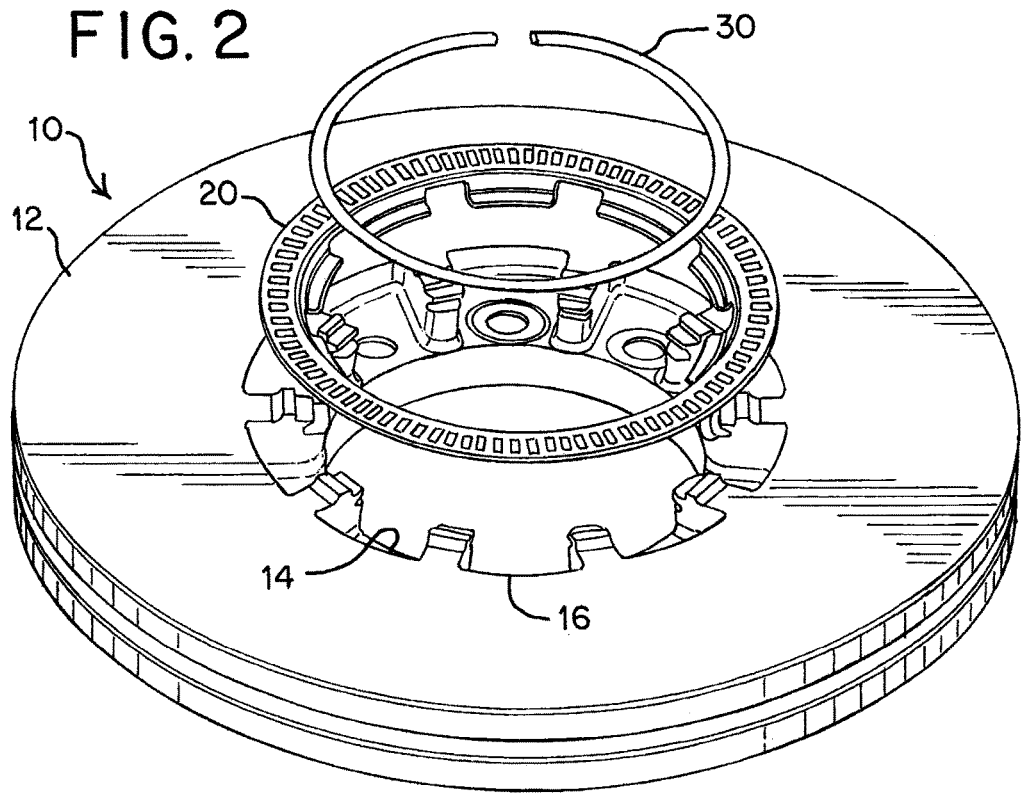
FIG. 2 is a perspective view of a brake rotor and tone ring and retaining ring in accordance with a first embodiment of the present invention with the components separated.
Figure 3:
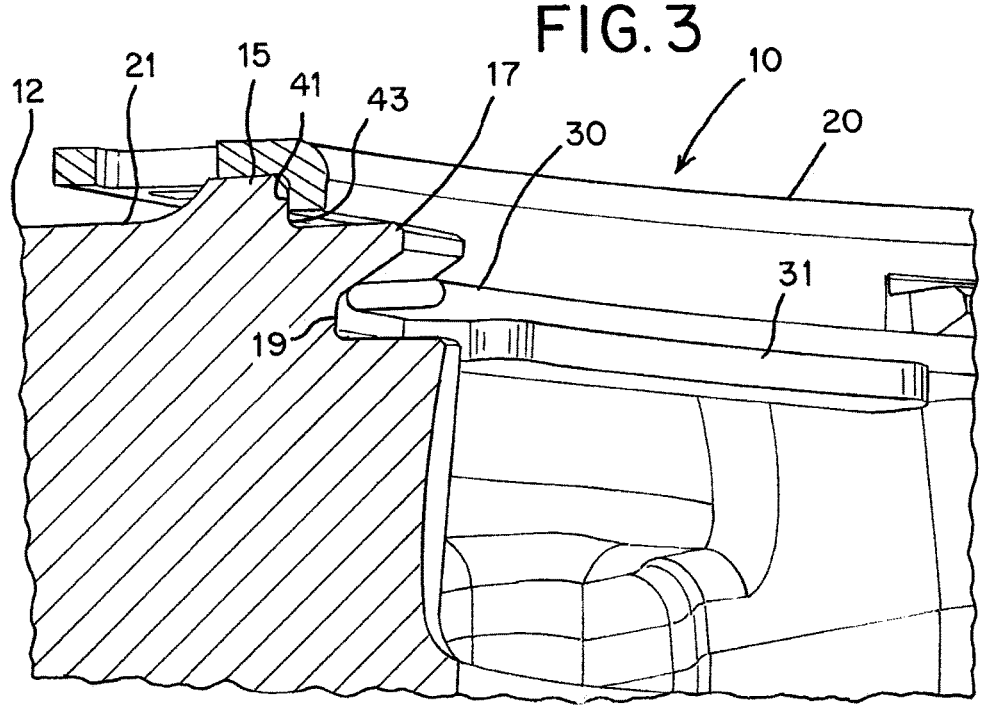
FIG. 3 is a detailed partial view of a brake rotor and tone ring and retaining ring in accordance with a first embodiment of the present invention.

Referring now to FIGS. 1-3, a disc brake assembly in accordance with a first embodiment of the present invention is shown generally at 10. A circular shaped brake rotor is shown at 12, with the usual material for brake rotor 12 being cast iron. Brake rotor 12 includes internal wall 14 which forms circular pocket 16. Snap retaining ring 30 is received in circular pocket 16. Snap retaining 30 is a circular shaped ring.

Tone ring 20 is placed adjacent ridge 15 extending from upper surface 21 of brake rotor 12. Tone ring 12 further includes an axially inner facing lip 41 in radial contact with a radially inward facing surface 43 of ridge 15 of brake rotor 12. Tone ring 20 is comprised of steel or other ferromagnetic materials that are known for use in such inductive tone rings.

Brake rotor 12 further includes a plurality of locating tabs 17. Each locating tab 17 includes a sloped surface 19 formed around and facing radially into circular pocket 16. Slope surface 19 of each locating tab contacts retaining ring 30 to force retaining ring 19 against a retaining tab 31 of tone ring 20. Each retaining tab 31 of tone ring 20 is fitted between two locating tabs 17 of brake rotor 12 to thusly restrict the rotation of tone ring 20 within brake rotor 12.

Tone ring 20 is seen to include inner lip 41 and upper surface 34. Inner lip 41 of tone ring 20 is fit adjacent a radially inward facing surface 43 of ridge 15 of brake rotor 12 to center the tone ring 20 about the rotating axis. A plurality of retaining tabs 31 extend radially inward from tone ring 20.

Upon assembly of disc brake assembly 10, tone ring 20 is placed on one side of brake rotor 12 adjacent ridge 15 extending from surface 21 of brake rotor 12. Tone ring 12 axially inner facing lip 41 is then in radial contact with a radially inward facing surface 43 of ridge 15 of brake rotor 12. Brake rotor 12 further includes a plurality of locating tabs 17. Each locating tab 17 includes a sloped surface 19 formed around and facing radially into circular pocket 16. Slope surface 19 of each locating tab contacts retaining ring 30 to force retaining ring 19 against a retaining tab 31 of tone ring 20. Each retaining tab 31 of tone ring 20 is fitted between two locating tabs 17 of brake rotor 12 to thusly restrict the rotation of tone ring 20 within brake rotor 12.

What is claimed is:
1. A disc assembly comprising:
   a rotating part,
   the rotating part having an internal wall forming a circular pocket,
   a tone ring received in the rotating part circular pocket, the rotating part having a plurality of locating tabs, each locating tab extending radially inward into the rotating part circular pocket from the internal wall of the rotating part,
each locating tab having a sloped surface as part of a retaining groove,
the tone ring having a plurality of retaining tabs, each retaining tab being positioned between two adjacent locating tabs of the rotating part,
and a retaining ring positioned against at least two of the sloped surfaces of the retaining groove of the rotating part, with the retaining ring also positioned against at least two of the retaining tabs of the tone ring.

2. The disc assembly of claim 1,
wherein the rotating part includes a ridge extending from an upper surface of the rotating part,
and the tone ring includes an inward facing surface that is radially adjacent the rotating part ridge.

3. The disc assembly of claim 1,
wherein the rotating part includes a ridge extending from an upper surface of the rotating part,
and the tone ring includes an outward facing surface that is radially adjacent the rotating part ridge.

4. The disc assembly of claim 1,
wherein each retaining tab of the tone ring is positioned between two adjacent locating tabs of the rotating part in a manner such that any rotation of the tone ring within the rotating part circular pocket is restricted.

5. The disc assembly of claim 1, wherein the rotating part includes a brake rotor.

6. The disc assembly of claim 1, wherein the rotating part includes a wheel hub.

7. The disc assembly of claim 1, wherein the rotating part includes a machine spindle.

8. A disc assembly comprising:
a rotating part, the rotating part including at least one of a brake rotor, a wheel hub, and a machine spindle
the rotating part having an internal wall forming a circular pocket,
an anti-lock brake sensing ring,
the rotating part having a plurality of locating tabs, each locating tab extending radially inward into the brake rotor circular pocket from the internal wall of the rotating part,
each locating tab having a sloped surface as part of a retaining groove,
the sensing ring having a plurality of retaining tabs, each retaining tab being positioned between two adjacent locating tabs of the rotating part,
and a retaining ring positioned against at least two of the sloped surfaces of the retaining groove of the rotating part, with the retaining also positioned against at least two of the retaining tabs of the brake sensing ring.

9. The disc assembly of claim 8,
wherein the rotating part includes a ridge extending from an upper surface of the rotating part,
and the sensing ring includes an inward facing surface that is radially adjacent the rotating part ridge.

10. The disc assembly of claim 8,
wherein each retaining tab of the sensing ring is positioned between two adjacent locating tabs of the rotating part in a manner such that any rotation of the sensing ring within the rotating part circular pocket is restricted.

11. A tone ring assembly configured to operate in connection with a rotating part, the rotating part having an internal wall forming a circular pocket, the rotating part also having a plurality of locating tabs, each locating tab extending radially inward into the rotating part circular pocket from the internal wall of the rotating part, each locating tab having a sloped surface as part of a retaining groove, the tone ring assembly comprising:
a plurality of retaining tabs, each retaining tab configured to be positioned between two adjacent locating tabs of the rotating part,
wherein the tone ring is configured to be received in the rotating part circular pocket, and
a retaining ring configured to be positioned against at least two of the sloped surfaces of the retaining groove of the rotating part, and also against at least two of the retaining tabs of the tone ring.

12. The tone ring assembly of claim 11, wherein the tone ring includes an inward facing surface that is configured to be installed in the rotating part such that it is radially adjacent to a ridge that extends from an upper surface of the rotating part.

13. The tone ring assembly of claim 11, wherein the tone ring includes an outward facing surface that is configured to be installed in the rotating part such that it is radially adjacent to a ridge that extends from an upper surface of the rotating part.

14. The tone ring assembly of claim 11, wherein each retaining tab of the tone ring is configured to be positioned between two adjacent locating tabs of the rotating part in a manner such that the locating tabs of the rotating part restrict rotation of the tone ring within the rotating part.

\* \* \* \* \*